United States Patent
Janssen et al.

(10) Patent No.: US 6,221,652 B1
(45) Date of Patent: Apr. 24, 2001

(54) PROCESS FOR BIOLOGICAL REMOVAL OF SULPHIDE

(75) Inventors: Albert Jozef Hendrik Janssen, Sneek; Cees Jan Nico Buisman, Harich, both of (NL)

(73) Assignee: Paques Bio Systems B.V., Balk (NL)

( * ) Notice: Subject to any disclaimer, the term of this patent is extended or adjusted under 35 U.S.C. 154(b) by 0 days.

(21) Appl. No.: 09/297,769

(22) PCT Filed: Nov. 26, 1997

(86) PCT No.: PCT/NL97/00647

§ 371 Date: May 7, 1999

§ 102(e) Date: May 7, 1999

(87) PCT Pub. No.: WO98/23359

PCT Pub. Date: Jun. 4, 1998

(30) Foreign Application Priority Data

Nov. 27, 1996 (EP) .................................................. 96203347

(51) Int. Cl.⁷ ....................................................... C12S 5/00
(52) U.S. Cl. ........................... 435/266; 435/264; 210/610; 210/614
(58) Field of Search ..................................... 435/266, 262, 435/281, 282, 264; 210/614, 615, 601, 603, 610; 71/8, 9, 10

(56) References Cited

U.S. PATENT DOCUMENTS

| | | |
|---|---|---|
| 1,701,825 * | 2/1929 | Seil . |
| 4,760,027 * | 7/1988 | Sublette . |
| 5,196,176 * | 3/1993 | Buisman . |
| 5,236,677 | 8/1993 | Torres-Cardona et al. . |
| 5,354,545 * | 10/1994 | Buisman . |
| 5,366,633 * | 11/1994 | Buisman . |
| 5,789,236 * | 8/1998 | Jennman . |
| 5,976,868 * | 11/1999 | Buisman . |
| 5,981,266 * | 11/1999 | Srivastava et al. . |

FOREIGN PATENT DOCUMENTS

| | | |
|---|---|---|
| 196 10 056 | 9/1997 | (DE) . |
| 0 224 889 | 6/1987 | (EP) . |
| 0 472 249 | 2/1992 | (EP) . |
| 2 262 457 * | 6/1993 | (GB) . |
| WO 91/18661 | 12/1991 | (WO) . |
| WO 93/24416 | 12/1993 | (WO) . |
| WO 96/30110 | 10/1996 | (WO) . |

* cited by examiner

Primary Examiner—William H. Beisner
(74) Attorney, Agent, or Firm—Young & Thompson

(57) ABSTRACT

A process for the removal of sulphides, including hydrogen sulphide, carbonyl sulphide and carbon disulphide, from a gas stream by scrubbing the gas with an aqueous washing liquid and treating the washing liquid with sulphide-oxidizing bacteria in the presence of an electron acceptor and reusing the treated liquid as a washing liquid, wherein the scrubbing and the bacterial treatment are carried out in the same reactor and nitrate is used as the electron acceptor. The process is especially useful of desulphurising gas at high pressure, such as natural gas.

10 Claims, 1 Drawing Sheet

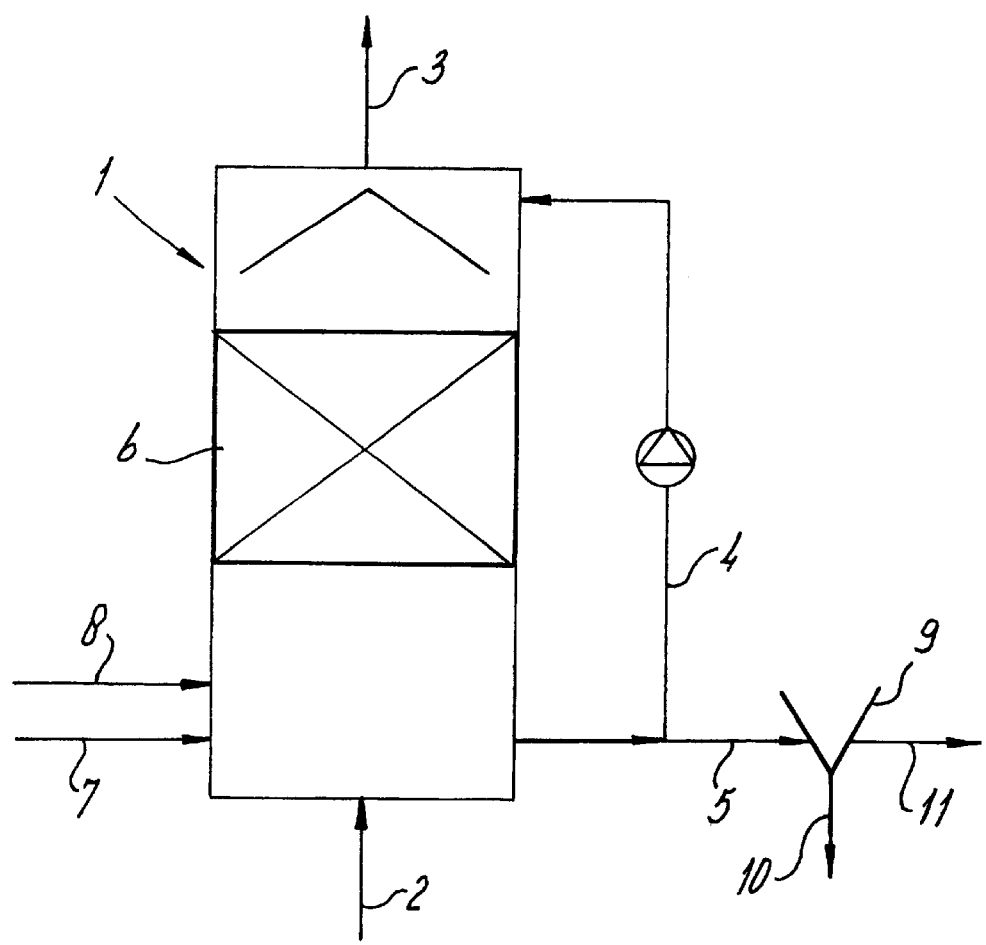

PROCESS FOR BIOLOGICAL REMOVAL OF SULPHIDE

CROSS REFERENCE TO RELATED APPLICATION

This is the 35 USC §371 national phase of international application PCT/NL97/00647 filed on Nov. 26, 1997, which designated the United States of America.

FIELD OF THE INVENTION

The present invention relates to a process for the removal of reduced sulphur compounds from a gas stream by scrubbing the gas with an aqueous washing liquid and treating the spent washing liquid with sulphide-oxidising bacteria in the presence of an electron acceptor in a reactor and recycling the treated liquid as a washing liquid.

BACKGROUND OF THE INVENTION

Such a process in known e.g. from WO 92/10270, WO 94/29227 and WO 96/30110. In these prior art processes oxygen is used as an electron acceptor. The oxygen is fed at a limited rate so as to direct the oxidation of sulphide to elemental sulphur rather than to sulphate. The use of oxygen as an electron acceptor, however, requires the presence of an aeration system including a compressor, pipings, spargers, and in most cases a separate reactor. The investment costs for such a system are relatively high, especially when small volumes of water or gas are to be treated or when e.g. high-pressure natural gas is to be desulphurised.

SUMMARY OF THE INVENTION

According to the invention, the spent washing liquid containing the reduced sulphur compounds is treated with sulphide-oxidising bacteria in an integrated scrubber/bioreactor, using nitrate as an electron acceptor.

In the present context, the term "reduced sulphur compound" is understood to comprise any gaseous or volatile sulphur compound wherein sulphur has the oxidation state-2. Such compounds include hydrogen sulphide, lower alkyl mercaptans such as methane-thiol, lower alkyl sulphides and disulphides such as dimethyl sulphide, carbonyl sulphide (COS) and carbon disulphide ($CS_2$). Especially relevant are $H_2S$, COS and $CS_2$.

The biological oxidation reactions of hydrogen sulphide by colourless sulphur bacteria, such as the genus Thiobacillus, especially the species *T. denitrificans*, using nitrate as an electron acceptor are the following:

$$H_2S + OH^- \rightarrow HS^- + H_2O \tag{1}$$

$$H_2S + HCO_3^- \rightarrow HS^- + H_2O + CO_2 \tag{1a}$$

$$5HS^- + 2NO_3^- + H_2O \rightarrow 5S^0 + N_2 + 7OH^- \tag{2}$$

$$5HS^- + 8NO_3^- + H_2O \rightarrow 5SO_4^{2-} + 4N_2 + 4N_2 + 3OH^- + H_2O \tag{3}$$

$$5H_2S + 2NO_3^- \rightarrow 5S^0 + N_2 + 2OH^- 4H_2O \tag{1+2}$$

$$5H_2S + 8NO_3^- + 2OH^- \rightarrow 5SO_4^{2-} + 4N_2 + 6H_2O \tag{1+3}$$

Reaction (1) denotes a preliminary reaction, e.g. occurring in a gas scrubber, wherein gaseous hydrogen sulphide is dissolved as hydrosulphide anions. Reaction (2) describes the anoxic oxidation of sulphide to elemental sulphur, whereas reaction (3) represents the complete oxidation of sulphide to sulphuric acid. Reaction (1+2) is the total net reaction of hydrogen sulphide to elemental sulphur.

Carbonyl sulphide and carbon disulphide may hydrolyse to hydrogen sulphide according to the following reactions or their anionic equivalents:

$$COS + H_2O \rightarrow H_2S + CO_2 \tag{4}$$

$$CS_2 + 2H_2O \rightarrow 2H_2S + CO_2 \tag{5}$$

Alternatively or additionally, COS and $CS_2$ may be oxidised directly, according to the following reactions;

$$5COS + 2NO_3^- + H_2O \rightarrow 5CO_2 + 5S^0 + N_2 + 2OH^- \tag{2'}$$

$$5COS + 8NO_3^- + H_2O \rightarrow 5CO_2 + 5SO_4^{2-} + 4N_2 + 2OH^- \tag{3'}$$

$$5CS_2 + 4NO_3^- + 2H_2O \rightarrow 5CO_2 + 10S^0 + 2N_2 + 4OH^- \tag{2''}$$

$$5CS_2 + 16NO_3^- + 2H_2O \rightarrow 5CO_2 + 10SO_4^{2-} + 8N_2 + 4H^+ \tag{3''}$$

The reactions involving oxidation of thiosulphate with nitrate as electron acceptor are the following:

$$5S_2O_3^{2-} + 8NO_3^- + 2OH^- \rightarrow 10SO_4^{2-} + 4N_2 + H_2O \tag{6}$$

$$5S_2O_3^{2-} + 2NO_3^- + H_2O \rightarrow 5S^0 + 5SO_4^{2-} + N_2 + 2OH^- \tag{7}$$

Nitrate can be added as a solid salt, but preferably it is added as a concentrated solution of e.g. potassium nitrate, or a mixture of a nitrate salt and nitric acid. As the conversion of $H_2S$ and other reduced sulphur compounds to elemental sulphur produces alkali (equation 1+2/2'/2"), and the conversion of $H_2S$ and other reduced sulphur compounds to sulphate consumes the same amount of alkali (equation 1+3/3'/3"), acid (preferably nitric acid replacing part of the nitrate) should be added in the preferred case where sulphide is predominantly converted to sulphur. Preferably, nitrate (and nitric acid) is added in a substantially stoichiometric amount for oxidation of reduced sulphur compound predominantly to sulphur, i.e. about 0.4 mole of nitrate per mole of $H_2S$ or COS, optionally allowing for minor oxidation to sulphate, i.e. 0.4–0.9, especially 0.4–0.6 mole of nitrate per mole of $H_2S$ or COS, and the double amount for $CS_2$. An overdosis of nitrate should be avoided, because it destabilises the process due to an accumulation of nitrite ($NO_2^-$). The nitrite concentration should remain below 1 mM, preferably below 0.5 mM.

The nitrate addition can be controlled using the redox potential of the aqueous solution, as described in WO 98/04503. Thus the redox potential of the medium of the oxidation is adjusted at a value below −150 mV (against an Ag/AgCl reference electrode), especially below −250 mV. The preferred redox potential range is form −300 to −390 mV, more preferably from −320 to −360 mV (against an Ag/AgCl reference electrode). The range of −300/−390 mV against Ag/AgCl corresponds to a range of −97/−187 mV against a $H_2$ reference electrode at 30° C. The redox setpoint values apply for a temperature of 30°C. and a pH of 8.

The temperature of the biological oxidation is between 10 and 85° C., the optimum being between 20 and 50° C., especially at about 30° C. The optimum pH is in the range of 7–9. If the solution does not contain nutrients, as is the case with gas scrubbing, these have to be supplied as well, This can be done at the same time as the nitrate supply. The electric conductivity of the washing liquid is preferably kept between 30 and 100 mS/cm.

The bacteria to be used in the present process can be taken from conventional sulphide-oxidising cultures. The bacteria are preferably neutrophilic bacteria and will typically include Thiobacillus species, especially T. denitrificans.

The process of the invention can be used for treating gases also containing carbon dioxide. The carbon dioxide contributes to the H₂S loading capacity of the scrubbing liquid, especially at high pressures. As an example, the H₂S loading capacity of a scrubbing liquid for scrubbing a pressurised gas (95 bar) having a $CO_2$ content of 1.1 vol. % is 200 to 300 g/m³. Also the carbon dioxide can be used as a carbon source for the sulphide-oxidising bacteria.

In the process of the invention for the removal of hydrogen sulphide and other reduced sulphur compounds from gas streams, the solution is recycled after oxidation of the reduced sulphur compounds to elemental sulphur, using the same reactor for scrubbing and for anoxic biological treatment. No liquid recirculation between different pressures is necessary. Further advantages are that the equipment can be relatively simple and inexpensive, and that the recycle ratio and thus the liquid residence time can be high so that any loss of biomass is compensated by bacterial growth. If required, the bacteria can be immobilised on a carrier, which carrier can be combined with a packing material in the scrubber. For a simple operation such immobilisation can be omitted.

BRIEF DESCRIPTION OF THE DRAWING

The single FIGURE depicts an installation suitable for carrying out the process according to the invention.

DETAILED DESCRIPTION OF THE INVENTION

The process can be performed in an installation as depicted in the FIGURE. According to this FIGURE, a gas scrubber/reactor 1 is equipped with a sulphide-containing gas supply 2 and a purified gas exit 3. Washing liquid is recycled through 4 without pressure difference and surplus liquid is drawn off at 5. The scubber contains a packing material 6 for improving contact between gas and washing liquid. Make-up water, containing nutrients and trace elements, is introduced through line 7. Nitrate (electron acceptor) is supplied through 8, but may also be added to the make-up water in 7. Nitric acid can be used for pH control and be added through 7 or 8 or separately. A separator 9 is disposed in bleed stream 5, where a sulphur slurry is separated off and discharged through 10. The clarified liquid 11 can be reused as make-up water at 7. As an alternative, a sulphur separator may be placed in recycle loop 4. Preferably the elemental sulphur is not completely separated: a residual level of 0.1–5 wt %, especially 0.3–3 wt. % is advantageous for enhance sulphide absorption by the washing liquid and improved buffering. The sulphur level in the scrubber/reactor can be adjusted by adjusting the recycle ration (flow 4 vs. flow 5) and/or by adjusting the separation efficacy of the sulphur separator.

The process of the invention can be advantageously applied of the treatment of small biogas streams, such as those producing less than 100 kg of sulphur per day. For such streams, the cost for the addition of nitrate is more than compensated by the saving on investment as a result of the omission of expensive compressors, spargers and other devices necessary for oxygen supply.

The process can also be used for treating ventilation air containing hydrogen sulphide, such as generated in anacrobic treatment reactors, pumping house and decanters. Where such venting air contains insufficient oxygen, or where the transfer of oxygen to the aqueous phase is insufficient, the nitrate suitable acts as an (additional) electron acceptor.

The process of the invention is also suitable for the treatment of natural gas and other gas streams of high pressure, e.g. 50 bar or higher. These high pressures normally make biological treatment of natural gas unattractive, because of the high energy consumption resulting form pressurising the washing liquid for entering the gas scrubber and depressurising the liquid for entering the aerated aerobic reactor. Prior art processes for removal of hydrogen sulphide and other reduced sulphur compounds from natural gas include (1) reversible chemical or physical absorption based on alkanolamine or carbonate solvent; these processed required high temperatures and pressure differences; also part of the expensive amine solution is lost with the bleed stream; (2) direct conversion through absorption and oxidation e.g. based on a redox reaction between H₂S and $Fe^{3+}$, wherein the reduced metal is reoxidised with oxygen; drawbacks of such processes are the tendency of plugging with sulphur solids and the use of expensive, corrosive metal chelates; (3) non-regenerative absorption, wherein hydrogen sulphide is absorbed onto, e.g., active carbon or iron sponges, which are regularly replaced and disposed ("throw away").

In the present process the pressurising/depressurising steps can be eliminated, since the biological treatment does not require oxygen gas and the gas scrubbing can thus be integrated with the bioreactor.

Other gases that can be treated with the process of the invention include gases associated with oil and natural gas, stabilisation gas, gas from high vacuum units, fuel gas, gas from HDS units, gas from molecular sieves, syngas, hydrogen sulphide-containing gas from $CO_2$ gas streams.

EXAMPLE 1

In an installation as depicted in FIG. 1 having a scrubber volume of 10 m³, natural gas at 95 bar containing 100 ppmv of H₂S and 1.1 vol. % of $CO_2$ is treated at 25,000 Nm³/day, using a scrubbing liquid having a pH of about 8.5 and using a biomass containing *Thiobacillus denitrificans*. Potassium nitrate and nitric acid are fed at 50–200 g/hr and 50–200 g/hr, respectively. A liquid recycle rate of 0.5–5 m³/hr is used. The H₂S content of the purified gas is 2 ppmv (desulphrisation efficacy: 98%).

EXAMPLE 2

An installation as depicted in FIG. 1, consisting of an integrated scrubber and bioreactor, was used for the removal of H₂S from ventilation air, which contains both H₂S and oxygen. The treated airflow amounts to 900 m³/h with a H₂s concentration between 500 and 800 ppm. The scrubbing liquid was held at a pH between 8.5 and 9 with a specific conductivity of 40 mS/cm. Nitrate was added at 0.3 kg/h from a combination of nitric acid and potassium nitrate such that the pH was maintained in the indicated range. The nitrate to sulphide ratio was 0.25 mol/mol, which is well below the theoretically expected ratio of 0.4–1.6 mol/mol. The reason for this is that the ventilation air contains oxygen which also acts as an electron acceptor. During the testing period, no H₂S could be detected in the off-gas, while the nitrate concentration was below 10 ppm. Residual elemental sulphur in the bleed stream was decanted and recovered.

What is claimed is:

1. A process for the removal of reduced sulfur compound comprising at least one component selected from the group consisting of hydrogen sulfide, carbonyl sulfide and carbon disulfide from a gas stream, the process comprising:

scrubbing the gas stream with an aqueous washing liquid to obtain a spent washing liquid;

biologically treating the spent washing liquid with sulfide-oxidizing bacteria in the presence of an electron acceptor to oxidize reduced sulfur compounds to elemental sulfur, and obtain a treated liquid;

reusing the treated liquid as a washing liquid;

the scrubbing and biological treatment being carried out in the same reactor by continuously adding as the electron acceptor a mixture of nitrate salt and nitrate acid at a rate of 04.–0.9 mole per mole of hydrogen sulfide or carbonyl sulfide and 0.8–1.8 mole per mole of carbon disulfide.

2. The process according to claim 1, wherein the elemental sulfur is partly removed form the treated liquid such that a residual level of sulfur ranging form 0.1–5wt. % remains.

3. The process according to claim 1, wherein the washing liquid has a specific conductivity ranging between 30 and 100 mS/cm.

4. The process according to claim 1, wherein neutriphilic sulfide-oxidizing bacteria are used.

5. The process according to claim 1, wherein the washing liquid has a pH ranging between 7 and 9.

6. The process according to claim 1, wherein the gas stream also contains carbon dioxide.

7. The process according to claim 1, wherein the gas stream is a gas having a pressure of at least 50 bar.

8. The process according to claim 1, wherein the gas stream is a ventilation gas.

9. The process according to claim 1, wherein the addition of nitrate is controlled by maintaining the redox potential of the aqueous washing liquid at between −300 and −390 mV, against an Ag/AgCl reference electrode.

10. The process according to claim 1, wherein 0.4–0.6 mole of nitrate/nitric acid per mole of hydrogen sulfide or carbonyl sulfide and 0.8–1.2 mole per mole of carbon disulfide is added as the electron acceptor.

* * * * *